(12) United States Patent
Lowekamp (10) Patent No.: US 7,792,061 B2
(45) Date of Patent: Sep. 7, 2010

(54) SYSTEM AND METHOD FOR OBTAINING LOCALIZED INFORMATION THROUGH A STRUCTURED OVERLAY NETWORK

(75) Inventor: Bruce B. Lowekamp, Williamsburg, VA (US)

(73) Assignee: Ooma, Inc., Palo Alto, CA (US)

( * ) Notice: Subject to any disclaimer, the term of this patent is extended or adjusted under 35 U.S.C. 154(b) by 147 days.

(21) Appl. No.: 12/217,759

(22) Filed: Jul. 7, 2008

(65) Prior Publication Data

US 2009/0016368 A1 Jan. 15, 2009

Related U.S. Application Data

(60) Provisional application No. 60/958,604, filed on Jul. 5, 2007.

(51) Int. Cl.
*H04L 12/26* (2006.01)

(52) U.S. Cl. ........................................ 370/255; 370/352

(58) Field of Classification Search ................. 370/255, 370/352; 707/5, 713
See application file for complete search history.

(56) References Cited

U.S. PATENT DOCUMENTS

| | | |
|---|---|---|
| 2004/0249970 A1 | 12/2004 | Castro et al. |
| 2006/0187900 A1* | 8/2006 | Akbar ........................ 370/352 |
| 2007/0025270 A1 | 2/2007 | Sylvain |
| 2007/0165613 A1 | 7/2007 | Soo et al. |
| 2009/0022149 A1* | 1/2009 | Rosenberg et al. .......... 370/389 |
| 2009/0182730 A1* | 7/2009 | Krishnamoorthy et al. ..... 707/5 |

OTHER PUBLICATIONS

Faltstron, P., "E.164 number and DNS," RFC2916, http://tools.ietf.org/html/rfc2916, Sep. 2000.
Koch, P., "A DNS RR Type for Lists of Address Prefixes (APL RR)," RFC3123, http://tools.ietf.org/html/rfc3123, Jun. 2001.
Eidnes, H., G. de Groot, and P. Vixie, "Classless IN-ADDR.ARPA delegation," RFC2317, http://tools.ietf.org/html/rfc2317, Mar. 1998.
Cox, R., A. Muthitacharoen, and R. Morris, "Serving NS using a Peer-to-Peer Lookup Service," in IPTPS, http://www.cs.rice.edu/Conferences/IPTPS02/178.pdf, Mar. 2002.
Mealling, M. and R. Daniel, "The Naming Authority Pointer (NAPTR) DNS Resource Record," RFC2915, http://tools.ietf.org/html/rfc2915, Sep. 2000.

* cited by examiner

*Primary Examiner*—Melvin Marcelo
(74) *Attorney, Agent, or Firm*—Lumen Patent Firm (57) ABSTRACT

A method of obtaining and using configuration information for communication devices in a P2P overlay for optimizing decision making based on locality is provided. An alpha-numeric hierarchical look-up procedure is provided that includes a general-to-specific search of a query having a result mapping of a location and purpose of the configuration information of the communication device. A registration procedure is provided for registering at least one resource, where the resource is found by the search on the overlay. The resource can be a communication device location, communication device information or the configuration information. The method provides calling an outside device from the overlay device and determining a gateway service provider that is most proximal to an area code or an exchange of the outside device by using the result mapping. An outside connection is established from the overlay device to the outside device, where a calling toll is minimized.

29 Claims, 3 Drawing Sheets

SYSTEM AND METHOD FOR OBTAINING LOCALIZED INFORMATION THROUGH A STRUCTURED OVERLAY NETWORK

CROSS-REFERENCE TO RELATED APPLICATIONS

This application is cross-referenced to and claims the benefit from U.S. Provisional Patent Application 60/958,604 filed Jul. 5, 2007, which is hereby incorporated by reference.

FIELD OF THE INVENTION

The present invention relates generally to peer-to-peer (P2P) communication systems and methods. More particularly, the present invention relates to P2P communication systems and methods where localized information is obtained through a structured overlay network.

BACKGROUND

In a conventional communications protocol development, and in particular VoIP deployment, each device, such as a phone, is configured with a local or dedicated server that is aware of all calling preferences, call routing, and options appropriate for that particular phone based on its statically known location. The general goal of peer-to-peer (P2P) or other decentralized serverless systems is to share the responsibilities of this server between all devices participating in the P2P overlay (in this document, P2P is used as a general term for decentralized serverless systems). Because this server functionality is now distributed among all of the devices without regard for location, there is no standard way to obtain information concerning how to make decisions based on the specific locations of any one or more devices in the overlay. Decentralizing a communications system in a P2P manner reduces the capital and operating expenses of the communication system, and they may scale over large deployments. For example, a P2P communications overlay might span multiple offices of a large multinational company. When placing an internal call, the device searches on the overlay to locate the destination of the call and initiates a VoIP call directly with the targeted device. However, when calling outside of the corporate phone system, an appropriate gateway to the traditional telephone network (PSTN) must be found. Two possible behaviors that might be desired are:

The calling device (caller) should locate a gateway (device that connects a VoIP call to the PSTN) in any one of the various corporate offices for which this call is a local call. This requires knowledge of which gateways are local to which area codes and exchanges.

Failing an appropriate gateway to make the call a local call, the caller might then fall back to the gateway closest to the caller, reasoning that if the call can't be local, at least it should find the shortest path across the network to deliver its VoIP traffic to a gateway before it is switched onto the PSTN.

Implementing a system that provides these behaviors requires:

The ability to identify a configuration file for a device on the P2P communications overlay based on the device's IP address, or other statically known information that is location specific such as the default network router's IP address, one or more routers obtained via running traceroute or GPS location, for example.

The ability for a P2P communications device to identify the closest other device providing a service (such as providing a PSTN gateway), where "closest" can be by some network metric, typically longest matching IP address prefix, but could instead be number of hops, latency, congestion, or bandwidth capacity, for example.

The ability to identify a P2P communications device providing a particular service to other members of the overlay based on information about structures outside the P2P communications overlay, such as mapping from standard (e164) telephone numbers to the most appropriate gateway on the P2P communications network.

In each of those cases, the searched-for device or information may be (or live on) a device actually participating in the overlay (referred to as a P2P communications device) or a device that is available to the members of the overlay and about which information is stored in the overlay by some other P2P communications device, but which is not actually participating in the overlay itself.

While conceptually simple, performing such a search in a P2P communications overlay is actually very difficult. P2P communications generally relies on a structured P2P overlay, which is optimized for questions such as "where is alice.smith@example-overlay located?" These questions can be answered in very little time, as the fundamental operation of a structured P2P overlay is a "fetch" that returns the resource stored corresponding to that exact search term. However, there is no support in a structured overlay for a fetch operation of the form "show me all of the registered users with the first name of alice in example-overlay," (i.e. search for alice.*@example-overlay example-overlay). Because of the nature of a structured overlay, such a search is not possible without walking through the entire list of registered users, which is prohibitively expensive in larger networks. A similar problem arises when trying to locate a gateway for a specific phone number, e.g. 804-555-0101, or a gateway closest on the network to a particular caller. Generally, the overlay cannot store an entry for all numbers that might be dialed, which would require an entry for each phone number in the world, nor can it support searches of the form "give me the best outbound gateway for 804-555-*," as described above. Similarly, when trying to find the closest gateway on the network, a P2P communications device typically only knows its IP address, e.g. 10.5.40.193, and its default router, e.g. 10.5.40.1. For a large branch office, the appropriate gateway might be several router hops away, at an IP address of 10.5.33.10. In such a configuration, with these example numbers, that gateway is likely responsible for over 4000 IP addresses. It is generally expensive, inefficient, and impractical to register all 4000 IP addresses for which the gateway is responsible in the overlay, so the potential caller cannot simply do a fetch for "10.5.40.193" in the overlay. Similarly, the device has no way of knowing that there is not a gateway responsible for its own local subnet (10.5.40), but instead for a higher level network prefix of 10.5.32/20, where 10.5.32/20 refers to 10.5 plus the first half of the eight bits used to represent the third number. In principle, a network administrator might configure all of the subnets the gateway is configured for into the overlay (e.g. including 10.5.40), but this then fails if the administrator is not aware that one of the subnets, for example 10.5.41, is itself split into two subnets 10.5.41.128/25 and 10.5.41.0/25.

The description thus far has been isolated to gateway location, but the general problem is broader, including issues such as locating local configuration files, which might be done in the same manner as searching for the closest (by IP prefix) gateway. Furthermore, while communication is most conventionally interpreted as bi-directional voice (telephone), the problems and methods described here apply equally to other communication forms, including other media types, uni-directional communication, data exchange and storage, etc.

Accordingly, there is a need to develop a reliable, accurate, and efficient way to obtain information concerning how to make decisions based on the specific locations of any one or more devices in the overlay.

SUMMARY OF THE INVENTION

To address the shortcomings in the art, a method of obtaining and using information for communication devices in a decentralized serverless network system (P2P overlay) for optimizing decision making based on locality is provided. The method includes providing an alpha-numeric hierarchical look-up procedure that includes a general-to-specific search of a query producing a result mapping of a resource in the overlay that is closest to the initial query. The invention further includes providing a registration procedure for registering at least one resource, where the resource is found by the search on the P2P overlay, and where the resource can be a communication device location, communication device information or the configuration information.

According to one embodiment of the invention, the method further includes calling an outside device from the P2P overlay device and determining a gateway service provider that is most proximal to an area code or an exchange of the outside device by using the result mapping. An outside connection is established from the P2P overlay device to the outside device through the most proximal gateway service provider, where a calling toll to the outside device is minimized. Here, the outside devices can include a gateway to another network, a bridge to another network, a proxy to another network, a public switched telephone network (PSTN) device, or an interface device between communication modes.

In one aspect of the invention, a hierarchy of the general-to-specific search data is stored in the P2P overlay, where the hierarchy is used to determine a normalized form for future fetches at runtime of the search.

In a another aspect, the hierarchical look-up procedure includes normalizing a query, where the normalized query is based on the configuration of the P2P overlay. Further included is partitioning the normalized query into a general-to-specific hierarchy, and executing a fetch of a most general partition of the hierarchy, where the most general partition fetch includes desired resource information, then returning a valid solution of the query if found and continuing searching if not found. The continued search includes executing a fetch of a more specific partition of the hierarchy, continuing with a longest-match of the more specific fetch and storing other shorter matches for backtracking usage, and starting a new search if no matches are found.

In a further aspect of the invention, the registration procedure includes normalizing the information to be stored, where the information normalization is based on the configuration of the P2P overlay, the service provider searching the P2P overlay according to the hierarchical look-up procedure to determine a location to store the registration, and storing a registration on a peer responsible for the registration in the P2P overlay. The stored registration may include a credential.

In another aspect of the invention, the responsible peer is responsible for determining when the responsible peer has received enough the registrations and when the hierarchy must be further partitioned. The responsible peer determines a query rewriting pattern to use for an additional layer of the hierarchy and transfers the registration to a more specific location if required by the new pattern. The responsible peer then replaces its list with the new pattern, thus indicating to future searches what should be fetched next. According to this aspect, the new pattern is based on preconfigured knowledge of which patterns are appropriate or which the patterns are based on general rules in a new layer of the hierarchy of the resource type (e.g. phone numbers). Here, the registration may include a credential, where the credential is transferred with the registration. Further, the service provider is responsible for refreshing its registration, where the refresh is initiated with a new search, and the new search is for the service provider's own registration, and a determination is made if the responsible peer has relocated its own registration to a more specific portion of the hierarchy. Additionally, the peer responsible for the registration is responsible for partitioning the hierarchy.

In another aspect of the invention, the normalized form of the query and other search configuration information are within a configuration file of the device. Here, the configuration file further may include a dial plan that is provided by a server within the P2P overlay, an order of search of numbers in the mapping, an extension number of the device, a personal phone book, call preferences, display preferences, user interface configuration, ringback, audible indication preferences or servers provisioned for the device, wherein the provisioned servers can include, for example, those providing outbound call, voicemail, hold music, or park services. According to this aspect, the order of search can include searching for the query in the P2P overlay, executing an enum search in a DNS for a direct Voip connection to the outside device, searching the P2P overlay for the gateway service provider to make a local call to the outside device, and searching the P2P overlay for the most proximal gateway service provider to a calling device. Here, the outside devices can include a gateway to another network, a bridge to another network, a proxy to another network, a public switched telephone network (PSTN) device, or an interface device between communication modes.

In yet another aspect of the invention, the query can be a device IP address, a phone number, an address, a text name, preconfigured data, autonomous system (AS) or a GPS location.

In another aspect of the invention, the outside devices can be a gateway to another network, a bridge to another network, a proxy to another network, a public switched telephone network (PSTN) device, or an interface device between communication modes. According to this aspect, the interface device between the communication modes can be a gateway from a computer network to the PSTN, a gateway to another telecommunications network or protocol, or servers outside the P2P overlay providing content or services to the P2P overlay devices.

According to another aspect, the result mapping can include a terminal solution, fetch-next solutions, query rewriting pattern for a more specific fetch solutions, or a retargeting of the look-up procedure solution. Here, the terminal solution includes a definite resultant value of the search where no further fetch is required. Further, the fetch-next solution includes a list of more specific solutions that can be further fetched for in a partitioned hierarchy of the resource type. According to this aspect, the rewriting pattern for a more specific fetch solution specifies a pattern applied to the normalized query, where the rewriting pattern includes a sequence of alpha-numeric characters that manipulate the normalized query into a new form, and the new form can be further fetched for in the overlay. Additionally, retargeting of the look-up procedure solution includes applying the look-up procedure to another format of the query that may include applying a rewritten pattern to the query and may include initiating a new search in the P2P overlay. Further, retargeting the look-up procedure solution includes determining further processing for the query based on a type of protocol or search method specified by the retargeting of the solution.

In another aspect of the invention, at least one hierarchical partition is searched for simultaneously by the P2P overlay device.

In a further aspect, the search includes a search to locate appropriate configuration files within the P2P overlay to provide a list of local dialplans and gateways, where a need for a phone number search is eliminated.

In yet another aspect of the invention, the search is within a predefined range of patterns, where the range includes a country dial pattern.

According to one aspect of the invention, the hierarchy into which the registration may be divided through the addition of new layers is specified by the service provider.

In yet another aspect, the registering device creates a hybrid list by adding a new query rewriting pattern to an existing list that does not contain a pattern representing members of the list, where the hybrid list includes the members of the list and the new query rewriting pattern. The pattern represents how the members should be stored as separate registrations, where the registering device also registers its resource separately according to the new pattern. As other registrations are refreshed by the other devices, the registrations of the other devices are removed from the list and registered separately according to the new pattern.

In a further aspect of the invention, the search further includes use of a STUN protocol query, STUN protocol query identifies and an appropriate search term, where the appropriate search term is based on a reflexive address used by a network address translation device. The appropriate search term can be combined with other the information to be used in forming the normalized query for using the alpha-numeric hierarchical look-up procedure.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

Figure 1:
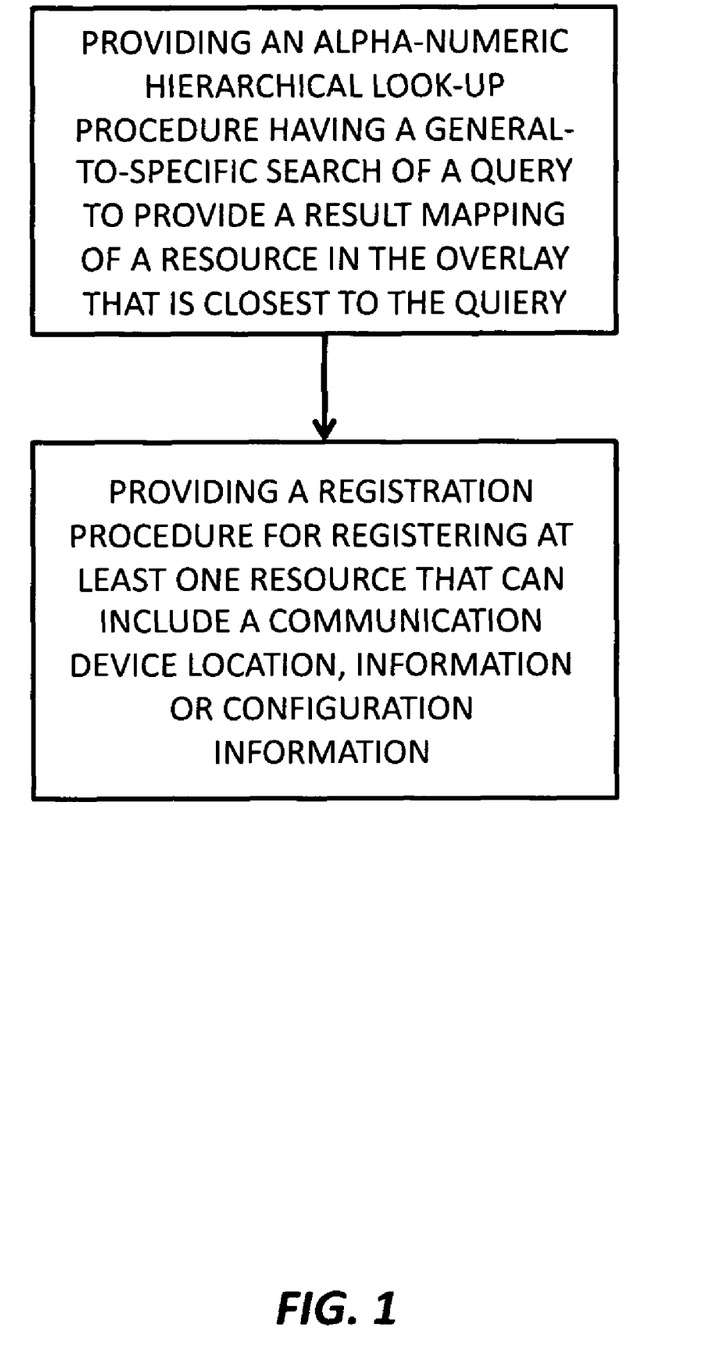
FIG. 1 shows a flow diagram of a method of obtaining and using configuration information for communication devices in a P2P overlay for optimizing decision making based on locality according to the present invention.

FIG. 1 shows a flow diagram of a method of obtaining and using configuration information for communication devices in a decentralized serverless network system (P2P overlay) for optimizing decision making based on locality according to the current invention. As shown, the method includes providing an alpha-numeric hierarchical look-up procedure that includes a general-to-specific search of a query producing a result mapping of a resource in the overlay that is closest to the initial query. The diagram further shows providing a registration procedure for registering at least one resource, where the resource is found by the search on the P2P overlay, and where the resource can be a communication device location, communication device information or the configuration information.

The challenge in obtaining information related to making decisions based on the specific locations of any one or more devices in the overlay is the ability to resolve the closest match to an arbitrary sequence alpha-numeric characters, for example phone numbers or IP addresses. To address this issue, the current invention uses a technique to fetch the sequence of characters in the overlay from general to specific components. Each fetch produces a result mapping, which can include one of:

A. The actual value of a solution, such as outboundproxy.example.com for a query for an outbound PSTN gateway. This is a terminal solution—no further fetches are required.

The remaining possibilities provide information to specify the form of further searches needed to determine the final solution.

B. A list of more specific prefixes that can be fetched next can be obtained. For example, a query for a U.S. phone number would begin with a fetch for +1. In that location there might exist 999 entries representing the valid area codes for the U.S., indicating that each can be fetched by submitting a more specific fetch, such as for +1804. Note, this is a simply an example, where explicitly listing 1000 entries in a single registration is not an efficient use of resources.

C. One or more query rewriting patterns that can be applied to the normalized query to determine a more specific prefix that can be fetched. For example, the correct representation for the previous example would be to indicate that any sequence of three digits should be fetched directly in the overlay.

D. A retargeting of the query. For example, a query for an exchange that is used by a large company through an internal prefix might be retargeted from +1804333xxxx to xxxx.big.company, which would be registered directly in the overlay and also is used by that big company itself for internal VoIP calling implemented through the P2P communications overlay.

Figure 2:
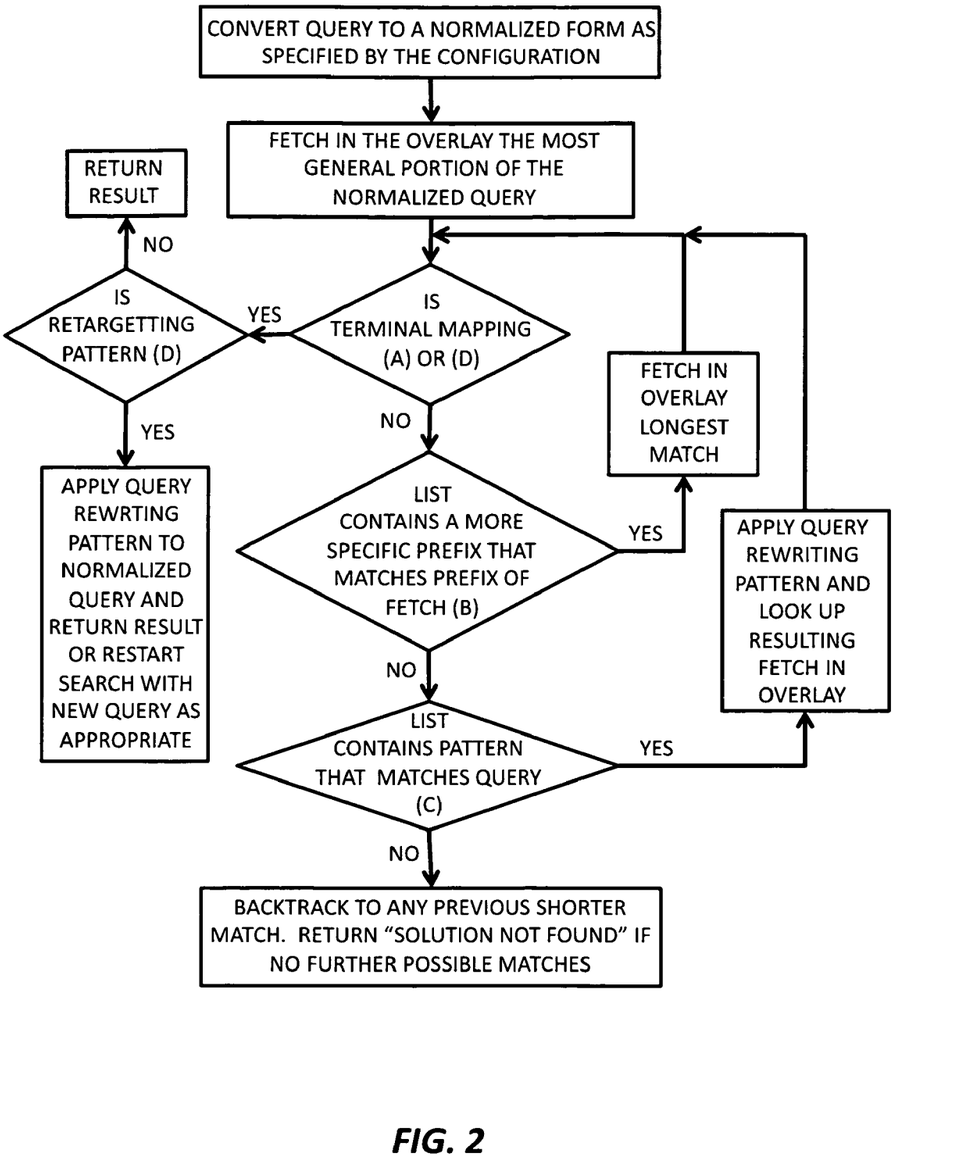
FIG. 2 shows a flow diagram of an iterative look-up process algorithm performed by a P2P communications device according to the present invention.

To process a query, or search, according to the current invention, the P2P communications device performs the following iterative algorithm as shown in FIG. 2:

1. Convert the query (e.g. phone number) to a normalized form as specified by the configuration, such as a phone number beginning with "+" then a country code, or an IP address in standard dotted decimal form (192.168.1.1). This normalized form may be specified in a configuration file previously obtained by the device using a similar search.

2. Fetch in the overlay the most general portion of the normalized query, for example a first digit of the country code for a phone number or the first octet of an IP address, such as 192, and combined with information about the type of resource desired, for example PSTN gateway, configuration file, etc.

3. If a terminal mapping (A) is found, and is the actual value of a solution, return that solution.

4. If a non-terminal mapping (B) or (C) exists, find the pattern (s) or element(s) in the list of more specific components that match the normalized form of the query. If there are multiple matches, the longest match will be the next fetch, but store any shorter matches for possible backtracking. Issue the next fetch and go to step 3 above.
5. If a retargeting solution (D) exists, apply the query rewriting pattern (if any) to the normalized query and initiate a new search in the manner appropriate for the retargeting result.
6. If no result is found for a fetch, first examine the result sets of previous fetches to determine if there was a shorter match that was not followed. If so, backtrack to that point and continue with the search. If there are no unresolved backtracking possibilities in the previous fetches, then there is no solution in the overlay and the search has failed. For example, no gateway in the corporate network may be able to make a local call to a particular phone number.

According to the current invention, before a searching device can perform a query, the device providing the service (service provider) must register its service in the overlay. While registering the specific service it provides, for example an outbound gateway to +1804555, is known in the art, building the set of hierarchical registrations is an important aspect of the current invention.

The service provider must be configured with the same normalized form information as the peers searching for the service. This is obtained from a configuration file, for example each search for a telephone number will begin with the first digit of the country code.

Assume that the peer responsible for the registration will also be responsible for partitioning the hierarchy. For example, if only two exchanges are registered in the system, they could both be listed explicitly off of the "+1" registration. However in a more fully populated system, more levels of hierarchy are required. The current invention provides alternatives to having the responsible peer handle repartitioning as described below.

Figure 3:
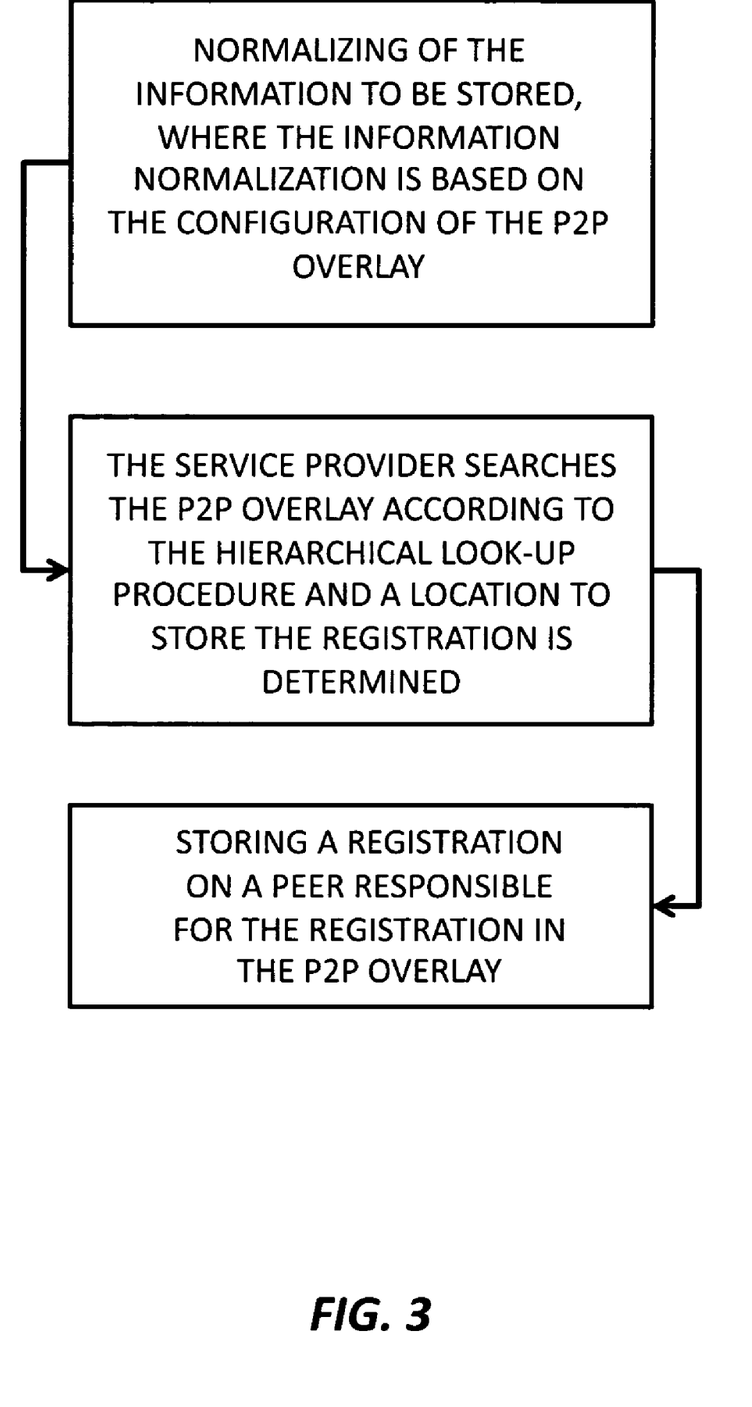
FIG. 3 shows a flow diagram of registration procedure according to the present invention.

In the current invention, the basic procedure to register a new entry, as shown in the flow diagram of FIG. 3, is to follow the search procedure to locate where the new entry should be stored. In many cases, this will yield the correct place to register. In the previous example, if the service provider finds that there is an entry for +1804xxx, then it merely registers its service in the overlay as +1804555.

In the more general case, the service provider begins the search and locates the most specific location its registration can be stored, where in a new overlay this might be +1. It then registers its entry in that location. The responsible peer (the one that holds the registration) stores that information. At this point, the service provider's initial registration is complete. The responsible peer is responsible for deciding when it has received enough registrations that it must further divide the hierarchy. When it does, it determines the best pattern to use for an additional layer of the hierarchy, transfers the registrations it is currently holding to more specific locations, and stores a query rewriting pattern that will indicate to future fetches what should be searched for next. New patterns may be based on preconfigured knowledge of which patterns are appropriate, for example the North American dialing pattern, or on general rules, such as a new layer of hierarchy for each two or three digits of a phone number.

Registrations for service providers, like other P2P communications overlay registrations, typically contain a security credential to prevent forgeries. Because the actual registrations themselves contain the credential, they are transferred with the registration as it is moved to a different place in the hierarchy.

The service provider is responsible for refreshing its registration, and will always begin its refresh by performing another search for its own registration, during which it will learn if the responsible peer decided to relocate its registration to a more specific portion of the hierarchy.

According to the current invention, the P2P communications device will first search for its configuration file in the overlay by beginning a search for its IP address with querytype=config as described above. It will locate configuration information that will specify (among other things) how to process local dialing. For example, a typical dialplan might specify that all three digit numbers are extensions to be searched for as xxx.company, all seven digit numbers are prefixed with +1804, all ten digit numbers are prefixed with +1, and all others are searched for as entered.

The local config can also specify a search order for how such phone numbers are to be resolved once the mapping is determined. For example, a typical search order would be to follow the above procedure to look the number up in the overlay if the target phone number is to a phone that is in the overlay. If not found there, do an enum search in DNS to see if a direct VoIP connection can be established with conventional session initiation protocol (SIP), where enum is a suite of protocols to unify the telephone system with the Internet. If that is not available, go to searching for an available PSTN gateway for which the phone number is a local call. Finally, if that is not available, find the closest outbound PSTN gateway.

Because of the nature of this exemplary dialplan, the P2P communications device must ensure it is downloading the proper configuration file. In some cases an administrator might specify a different configuration file for each device, but in most cases the dialplan configuration would be uniform for each phone in a particular office. Because IP addresses (subnets) are almost universally specific to a particular office, searching for the configuration file based on the longest prefix matching the device's IP address will typically determine the appropriate configuration file. In this example, a P2P communications device should also be able to determine if the configuration file has been submitted by an appropriate administrator, or at least in an overlay that is not secured to a single company. Public key security mechanisms should be sufficient for such verification.

Examples of utilizing this algorithm in the current invention are provided, without limiting the scope of the invention. The fields and values shown are one possible representation for the actual encodings that can be used to describe the relevant fetch string in an implementation of the protocol. For query rewriting pattern expressions, the examples are based on the regular expression replacement rules and flags of NAPTR (RFC2915, Section 3 and 2, respectively).

For a query example, a device starts up and searches for its local conFIG. In this example its IP address is 192.168.25.10, which is the normalized form of the query. It searches for its config file by beginning with a fetch for the first octet of its IP address (192). Because it has an IPv4 address, it includes this in the query type. If it were given an IPv6 IP address, it would include "v6" instead. The search includes:

Fetch: type=config,v4;192
Response: /(192\.[[digit]]\{1,3\})\..*\1/
Explanation: search for the first octet produces a query rewriting pattern applied to the full IP address, that specifies the next search is for the first two octets.

Fetch: type=config,v4 192.168
Response: /(192\.168\.[[digit]]\{1,3\})\..*\1/
Explanation: search for the first two octets results in a query rewriting pattern specifying the first three octets when applied to the full IP address.

Fetch: type=config,v4 192.168.25
Response: flag=u;ftp://192.168.25.2/company-phoneconFIG.xml Explanation: flag specifies this as a terminal result indicating the search should next request this URI. After the file is retrieved, the P2P phone is ready to be used. At some point later, the user dials extension 201. That extension is mapped to 201.company by the dialplan in the config file. The search in the overlay for 201.company returns how to contact that phone directly.

Later, the user dials 555-0234, which is actually the standard PSTN number for an internal extension at the same company. The dialplan maps this to a normalized query of +18045550234 and begins searching for this in the overlay, beginning with the first digit.

Fetch:type=phone +1
Response: /(\+1[[digit]]\{3\}).*Λ1/
Explanation: This query rewriting pattern indicates that the next fetch should consist of +1 plus the area code.
Fetch:type=phone +1804
Response: +1804535, +18045550
Explanation: Rather than another query rewriting pattern regular expression, this response provides an explicit list of possible prefixes (note that they are different lengths). In this case, only one matches, so it is searched for next.
Fetch: type=phone +18045550
Response: flag=p;/+18045550([[digit]]\{3\})Λ1\.company/
Explanation: The flag in the response indicates that this query rewriting pattern is protocol specific, meaning it should be fetched directly in the overlay. The regular expression pattern indicates that the last three digits of the phone number should be extracted and used to form an internal extension 234.company, which is the same form as indicated by the dialplan for dialing a three digit extension.
Fetch: 234.company
Response: sip:234@192.168.10.25
Explanation: The final fetch is for the internal extension, which returns SIP contact information that can be used to place the call.

The user dials 4103421111. The dialplan maps this to a normalized query of +14103421111. The search for +1 was previously done and, if not expired, is still cached, so the search begins with the next level:
Fetch: type=phone +1410
Response: /(+1410[[digit]]\{3\}).*Λ1/
Explanation: search for the exchange.
Fetch: type=phone +1410342
Response: (+1410342[[digit]]\{4\})Λ1/
Explanation: individual phone numbers are registered in the overlay.
Fetch: type=phone +14103421111
Response: not found.
The preceding example might occur when some phones in this exchange are probably participating in the overlay (thus the presence of the exchange prefix), but this particular phone is not participating. Following its configured search list, the phone then begins to search for a gateway that would have this phone in its local calling area:
Fetch: type=localgateway +1
Response: /(+1[[digit]]\{3\}).*Λ1/
Explanation: Add the area code to the search.
Fetch: type=localgateway +1410
Response: /(+1410[[digit]]\{2\}).*Λ1/
Explanation: Add the first two digits of the exchange to the fetch.
Fetch: type=localgateway +141034
Response: flag=u;/(.*)/sip:\1@gateway.company\.com/, /(.*)/sip:\1\.fromp2p@gw\.othercompany\.com/

This response indicates there are two gateways available for which this is a local call. The phone can then choose between them if it has any algorithm for a preference.

These examples have been US-centric, but the system also works for international numbers. In particular, it has sufficient complexity to adapt to the different dialing patterns used around the world. Suppose that the user dials an Egyptian Bank: +200222612200
Fetch: type=localgateway +2
Response: +20,+27,/(+2[[12345689]][[digit]]).*Λ1/
Explanation: Egypt and South Africa have two-digit country codes beginning with "2", all other countries that begin with "2" have three-digit country codes. +20+ is chosen because it is the only match.
Fetch: type=localgateway +20
Response: /(+20[[digit]]\{2\}).*Λ1/
Explanation: Egypt uses city codes of two and three digits. Matching on the first two divides up the hierarchy and allows subsequent entries to deal with the variations.
Fetch: type=localgateway +2002
Response: /(+2002[[digit]]\{3\}).*Λ1/
Explanation: Match on the next three digits.
Fetch: type=localgateway +2002226
Response: flag=u;/(.*)/sip:\1@egypt\.company\.com/,
Explanation: The company has a gateway that serves that part of Egypt.

Exemplary registration examples are provided without limiting the scope of the invention. In each of these examples, a gateway is registering +1804555 with type=localgateway
Fetch:type=localgateway +1
Response: /(\+1[[digit]]\{3\}).*Λ1/
Explanation: This indicates that the next fetch should consist of +1 plus the area code.
Fetch: type=localgateway +1804
Response: /(+1804[[digit]]\{3\}).*Λ1/
Explanation: search for the exchange.
Fetch: type=localgateway +1804555
Response: not found
Explanation: The gateway's exchange is not currently registered in the overlay and there is no more specific pattern that would be appropriate. Therefore it registers itself in this location.
Register type=localgateway +1804555=>sip:!*@gateway.company.com
Explanation: this registration is now stored for future queries.

A different example of performing the same registration:
Fetch:type=localgateway +1
Response: /(\+1[[digit]]\{3\}).*Λ1/
Explanation: This indicates that the next fetch should consist of +1 plus the area code.
Fetch: type=localgateway +1804
Response: +1804348, +1804564
Explanation: In this case, there is a list stored in this entry. The service provider will make two registrations.
Register: type=localgateway +1804=>+1804555
Explanation: Add itself to the above list as an exchange that can be searched for.
Register: type=localgateway +1804555=>sip:!*@gateway.company.com
Explanation: add the actual registration that future queries will use to find the gateway.

Provided below is an example of a responsible peer deciding it has too many registrations and transferring some based on a new query rewriting pattern:
Existing registration key: type=localgateway +1804

Existing registrations: +1804348, +1804564, +1804565, +180434892

Explanation: There are four registrations here, three of which for entire exchanges and one for a two digit block (perhaps for a particular company). The responsible peer has the four registrations for these entries in addition to them having their final individual registrations in the overlay (with the pointer to the actual gateway). Based on preconfigured knowledge, the responsible peer is aware of a North American dialing pattern and will choose the regular expression for +1804xxx to direct future searches. However, not all of its current registrations are exact matches to this pattern, so it must first register the additional resource in the overlay itself. (Note that in this case there is already a pointer from +1804348 to the gateway handling that entire exchange.)

Register: type=localgateway +1804348=>+180434892

Explanation: Future fetches for +1804348 will now return a list, one for the entire prefix and the other directing a fetch for the smaller portion of the exchange.

New registration value: /(+1410[[digit]]\{3\}).*∧1/

Explanation: Now that the previous registration has been updated, the responsible peer removes its own list and merely returns this query rewriting pattern directing future searches to fetch directly for their particular exchange.

The process is started by the first service provider registering for this type of service, in this example registering a gateway for the +1804555 prefix:

Fetch:type=localgateway +1

Response: not found

Explanation: There are no local gateways registered.

Register: type=localgateway +1=>+1804565

Explanation: As there are no other registrations, begin the list with a pointer to the servicd provider's registration.

Register: type=localgateway +1804555=>sip:!@gateway-.company.com

Explanation: add the actual registration that future queries will use to find the gateway.

Dialplans are configured into SIP devices that provide them with a list of dialing patterns and an appropriate way to translate those patterns into other patterns or an appropriate outbound server to use to contact a particular numeric pattern. In a traditional SIP deployment, these are local configuration files that are obtained from the local server. The current invention provides a system that allows a device to search the overlay for such configuration information based on its phone number, IP address, or other identifying information.

In traditional DNS, the entire query is sent to a general-purpose server that evaluates the query to determine some more-appropriate server. The server is responsible for doing all of the processing on the query and returning the portion of its entries that it believes are most appropriate (which may be actual answers or redirection to other servers). The current invention provides the same functionality in a way that imposes no computational load on the responsible server (or peer in this case). Furthermore, DNS assumes the existence of a general server that can evaluate a more appropriate server for each query. In a P2P overlay there is no such general service—the querying device must know how to divide the query to its initial form to determine the responsible peer.

The current invention provides structured P2P storage systems capable of locating information based on its physical or network proximity. The heavy focus of P2P work on anonymization, in fact, tends to oppose this goal. The implementations of the basic localization goals provided by the current invention include:

- The ability to locate in a structured P2P overlay information for a device based on its IP address or other identifying information without having an entry for specific IP addresses or other identifiers of each device served.
- The ability to identify the closest (by some network metric) other device providing a service (such as a PSTN gateway) to a particular device.
- The ability to identify a device providing a particular service to other members of the overlay based on hierarchical information about structures outside the P2P communications overlay, such as mapping from standard (e164) telephone numbers to the most appropriate gateway.

As set forth above, the primary distinguishing features of this invention are related to its ability to add generalized hierarchical search to a structured P2P overlay, inherently not designed for such searches. However, there is an additional aspect to consider for application of these searches. Searching for phones, configuration files, and gateway devices have been described, however other search types are possible and more specific variations on those themes are also possible. For example, gateways supporting various calling plans are possible rather than just gateways with unlimited local calling.

Rather than performing an intelligent search from least to most specific, simultaneous fetches may be launched, e.g. for 804-555-0890, translate to +1, +18, +180, +1804, +18045, etc. Each of these 11 fetches can be run simultaneously, and while most will fail, the correct result will quickly be received.

A direct translation of enum to overlay queries is possible. enum is based on the assumption that a device has no local way of contacting the desired phone number, and therefore it must attempt to locate a means of contacting the desired phone number across the global Internet. It also assumes there is a single solution created by the entity responsible for each phone number. The current invention differs because it addresses a different problem: in a P2P network there may be a variety of ways of contacting the called phone number through other peers present in the overlay but remotely located on other portions of the Internet. Therefore a complete solution for the issues addressed by the current invention must support both local configuration, which is already assumed to have been made before the enum look-up is made and the problem must be addressed directly, and the availability of remote resources in the P2P communications overlay, such as a gateway at a different branch office, that might be preferred to make the call even though the provider of the target phone number itself might specify a different contact method for arbitrary hosts on the Internet to use that would be looked up through enum.

enum is not optimized for use by P2P fetch, but for DNS. For comparison, consider how a phone number is resolved. 804-555-0890 is translated in enum (in reverse order) to 0.9.8.0.5.5.5.4.0.8.1.e164.arpa, which is the address that is actually searched for in DNS. DNS resolves this address by locating the server responsible for the suffix "e164.arpa" and sending it the entire search term. That server then returns a result for as much of the query as it can. For example, in this case the first response will likely be a redirection to the server responsible for "1.e164.arpa", which is the US country code. That server, being a US server, will then look immediately at the entire area code and redirect appropriately to a server responsible for the area code "4.0.8.1.e164.arpa". The process continues until an entry is found for how to contact the phone number, or until no result is found, in which case the calling device must place the call using its own PSTN gateway.

A significant benefit of the DNS model is that at each stage the most specific DNS server known is contacted and is sent the entire search string, which it then decides how to process. For example, in this case the first digit "1" is the country code, but because most countries have multiple-digit country codes, that same server will resolve a server for the appropriate number of digits. However, in P2P systems, the fetch must be based on a fixed string that must be located in the overlay, so the only way to use enum directly involves a separate search for each possible string, adding one digit at a time.

Solutions to resolve DNS names via P2P overlays rely on the ability to search for an entire name in the overlay in one operation, e.g. "www.example.com". However, a P2P communications overlay would not span the entire international phone system, but instead consist of a few hundred devices that need the ability to call any number in the international system but do not have the capacity to store a mapping for every single number in the world. Therefore, resolving the entire "0.9.8.7 . . . " string is inefficient as every number requires numerous fetches to resolve. The most obvious solution, then is to resolve each component individually, i.e. "arpa", "e164.arpa", "1.e164.arpa", etc, but this leads to tremendous inefficiencies due to the number of fetches that must be made. Even so, we are not aware of any solution that proposes encoding DNS in P2P systems in such a way, because they do not attempt to solve this type of search.

The solution of the current invention differs both in that it supports incremental look-up, and with results available as patterns or multi-digit matches. For example, in a system that has only one available gateway, all telephone number queries immediately return the same gateway, without searching through any digits.

The search for local config could result in a download of all locally relevant dialplans and gateways, eliminating need to search based on phone number. This solution would not apply to large-scale overlays.

By restricting the range of patterns, e.g. by preloading understanding of US/Canada dialing patterns, the number of searches that can be run is greatly reduced. This technique would work well in many countries, although preloading all patterns for all countries might be prohibitive.

The provided example of registering a new localgateway made the assumption that the responsible peer would handle dividing the registered entries into additional layers of hierarchy as needed. There is an alternative option where the service provider, i.e. registering gateway, makes the decision to add its registration in an additional layer of hierarchy. There is also third possibility of having a central administrator responsible for designing the hierarchy and registering in the overlay, although this is not a particularly peer-to-peer solution.

If the registering peer makes the decision, then when it reaches a list it would like to add its registration to that is too long and does not contain a further query rewriting pattern, it instead registers a query rewriting pattern that describes where its next registration should be found. This will have the result of producing a hybrid list, such as:

Registrations: +1804348, +1804564, +1804xxx, +180434892

Because this adds ambiguity to searches, such a pattern would not be added if the registering gateway is only adding another instance of a current member of the list (e.g. +1804564).

When the peers responsible for the other members of the list refresh their registration, they will notice that a query rewriting pattern is now present and remove their specific registration from the list.

One of the complexities in handling large-scale P2P networks is that peers at different locations (multiple homes and multiple offices) may be behind network address translations (NAT), which allow multiple machines at a single location to share a single IP address such as that provided by a broadband ISP. However, this makes P2P overlays more difficult to implement because each peer in the overlay believes it has an IP address, such as 192.168.1.100 that is different than the IP address of the NAT, which is what the other peers in the overlay see. Furthermore, almost all NATs assign their client machines addresses from the same block of private addresses, 192.168.x.x.

To extend our solution for searching for configuration files to overlays where NATs are in use, a device must add additional unique information to its search query. Fortunately, the Simple Traversal of UDP though NATs (STUN) protocol (RFC3489bis) allows a peer to determine the public address used by the NAT it is behind, and searching for a combination of this public address and the device's own internal address, such as searching for 172.18.5.130:192.168.1.100 in the normal hierarchical manner will allow an appropriate configuration file to be found.

Each device in a computer network is assigned, in hardware, a globally unique identifier known as a MAC address. The most direct way of registering configuration information for a specific device in an overlay is to use this MAC address. However, because the hierarchy of these globally unique MAC addresses is divided according to the manufacturer of the particular network chip and the order the chips come of the assembly line, there is no linkage between the hierarchy of MAC addresses and the location or intended configuration of a deployed device, unlike IP addresses, which are assigned based on their deployed location in the network.

Numeric searches have been disclosed, however locating the most appropriate server for a particular geographic region is also possible, particularly if the hierarchical method of encoding location is provided by the current invention (for example, country.province.city.neighborhood). Such an encoding could be used for locating 911 service, for example.

As described earlier, P2P overlay networks are very good at searching for alice.jones@company.com, but not capable of searching for alice.*@company.com. The algorithms described above are also capable of searching for names starting with a particular prefix, such as alice.*. Intelligent registrations, such as registering both alice.smith and smith.alice, could allow for searching based on either first or last name. Beginning the search based on the first letter would be appropriate, and would allow the system to adapt to its load as described earlier in dividing registrations based on load.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art.

All such variations are considered to be within the scope and spirit of the present invention as defined by the following claims and their legal equivalents.

What is claimed is:

1. A method of obtaining and using information for communication devices in a decentralized serverless network system (P2P overlay), the method comprising:
   a. performing by a P2P overlay device in the network system an alpha-numeric hierarchical look-up procedure comprising: i) performing a general-to-specific search of a query on said P2P overlay, ii) receiving, as a result of the search, a result mapping of a resource in said overlay that is closest to said query; and b. performing by a service provider in the network system a registration procedure comprising registering a resource of the P2P overlay; wherein said resource is selected from the group consisting of a communication device location, communication device information and configuration information; wherein said resource is found by said search on said P2P overlay.

2. The method of obtaining and using information of claim 1 further comprising:
   a. calling an outside device from said P2P overlay device;
   b. determining a gateway service provider that is most proximal to an area code or an exchange of said outside device using said result mapping; and
   c. establishing an outside connection from said P2P overlay device to said outside device through said most proximal gateway service provider, whereby a calling toll to said outside device is minimized.

3. The method of obtaining and using information of claim 2, wherein said outside device is selected from the group consisting of a gateway to another network, a bridge to another network, a proxy to another network, a public switched telephone network (PSTN) device, and an interface device between communication modes.

4. The method of obtaining and using information of claim 1, wherein a hierarchy for said general-to-specific search is stored in said P2P overlay.

5. The method of obtaining and using information of claim 1, wherein said hierarchical look-up procedure comprises:
   a. normalizing the query to produce a normalized query based on a configuration of said P2P overlay;
   b. partitioning a hierarchy for said general-to-specific search;
   c. executing a fetch of a most general partition of said hierarchy to request desired resource information;
   d. continuing search if the desired resource information is not found, wherein said continued search comprises:
      i. executing a fetch of a more specific partition of said hierarchy;
      ii. continuing search with a longest-match of said more specific partition, and storing other shorter matches for backtracking usage; and
      iii. starting a new search if no matches are found.

6. The method of obtaining and using information of claim 1, wherein said registration procedure comprises:
   a. normalizing information to be stored, wherein said information normalization is based on said configuration of said P2P overlay;
   b. searching a hierarchy stored in said P2P overlay to determine a location to store said registration;
   c. storing a registration on a peer responsible for said registration in said P2P overlay.

7. The method of obtaining and using information of claim 6, wherein said responsible peer is responsible for determining when said responsible peer has received enough said registrations and for determining when said hierarchy must be further partitioned.

8. The method of obtaining and using information of claim 6, further comprising i) creating by a registering device a hybrid list by adding a new pattern to an existing list, ii) separately registering by said registering device its resource according to said new pattern.

9. The method of obtaining and using information of claim 8, wherein said new pattern is based on preconfigured knowledge of which patterns are appropriate or which patterns are based on general rules in a new layer of said hierarchy.

10. The method of obtaining and using information of claim 6, wherein said registration comprises a credential, wherein said credential is transferred with said registration.

11. The method of obtaining and using information of claim 6, wherein said service provider is responsible for refreshing its registration, wherein said refreshing is initiated with a new search, wherein said new search is for said service provider's own said registration.

12. The method of obtaining and using information of claim 6, wherein said peer responsible for said registration is responsible for partitioning said hierarchy.

13. The method of obtaining and using information of claim 1, wherein said P2P overlay device has a configuration file comprising said query and said configuration information.

14. The method of obtaining and using information of claim 13, wherein said configuration file further comprises information selected from the group consisting of a dial plan provided by a server within said P2P overlay, an order of search of numbers in said result mapping, an extension number of said P2P overlay device, a personal phone book, call preferences, display preferences, user interface configuration, ringback, audible indication preferences and device-specific servers.

15. The method of obtaining and using information of claim 1, further comprising:
   a. searching for said query in said P2P overlay;
   b. executing an enum search in a DNS for a direct Voip connection to an outside device;
   c. searching said P2P overlay for a gateway service provider to make a local call to said outside device; and
   d. searching said P2P overlay for a most proximal gateway service provider to a calling device.

16. The method of obtaining and using information of claim 15, wherein said outside device is selected from the group consisting of a gateway to another network, a bridge to another network, a proxy to another network, a public switched telephone network (PSTN) device, and an interface device between communication modes.

17. The method of obtaining and using information of claim 1, wherein said query is selected from the group consisting of a device IP address, a phone number, an address, a text name, preconfigured data, autonomous system (AS) and a GPS location.

18. The method of obtaining and using information of claim 16, wherein said interface device between said communication modes is selected from the group consisting of a gateway from a computer network to said PSTN, a gateway to another telecommunications network or protocol, and servers outside said P2P overlay providing content or services to said P2P overlay devices.

19. The method of obtaining and using information of claim 1, wherein said result mapping is selected from the group consisting of a terminal solution, a fetch-next solution, at least one query rewriting pattern for a more specific fetch solution, and a retargeting of said look-up procedure solution.

20. The method of obtaining and using information of claim 19, wherein said terminal solution comprises a definite resultant value of said search where no further fetch is required.

21. The method of obtaining and using information of claim 19, wherein said fetch-next solution comprises a list of more specific solutions that can be further fetched for in a partitioned hierarchy of said query.

22. The method of obtaining and using information of claim 19, wherein said at least one query rewriting pattern for a more specific fetch solution specifies a pattern applied to a normalized query, wherein said at least one query rewriting pattern comprises a sequence of alpha-numeric characters that manipulate said normalized query into a new form, wherein said new form can be further fetched for in said P2P overlay.

23. The method of obtaining and using information of claim 19, wherein said retargeting of said look-up procedure solution comprises applying said look-up procedure to another format of said query, wherein said another format may be determined by applying a rewriting pattern to a normalized query.

24. The method of obtaining and using information of claim 19, wherein said retargeting of said look-up procedure solution comprises determining further processing for said query based on a type of protocol or search method specified by said retargeting of said solution.

25. The method of obtaining and using information of claim 1, further comprising searching by a different P2P overlay device for at least one hierarchical partition.

26. The method of obtaining and using information of claim 1, wherein said search comprises a search to locate appropriate configuration files within said P2P overlay to provide a list of local dialplans and gateways, whereby a need for a phone number search is eliminated.

27. The method of obtaining and using information of claim 1, wherein said search is within a predefined range of patterns comprising a country dial pattern.

28. The method of obtaining and using information of claim 1, further comprising specifying by a service provider a hierarchy into which said registration may be divided by the addition of new layers.

29. The method of obtaining and using information of claim 1, wherein said search further comprises use of a STUN protocol query that identifies an appropriate search term, wherein said appropriate search term is based on a reflexive address used by a network address translation device, wherein said appropriate search term can be combined with other said identifiers to be used in locating an appropriate file using said alpha-numeric hierarchical look-up procedure.

* * * * *